(12) United States Patent
Jeng

(10) Patent No.: US 7,991,674 B2
(45) Date of Patent: Aug. 2, 2011

(54) INVESTMENT ALLOCATION SYSTEM FOR MANAGING INVESTMENT RETURN AND RISK AND METHOD THEREOF

(75) Inventor: Jenher Jeng, Linnei Township (TW)

(73) Assignee: Sifeon Knowledge-Technology, Taichung (TW)

( * ) Notice: Subject to any disclaimer, the term of this patent is extended or adjusted under 35 U.S.C. 154(b) by 59 days.

(21) Appl. No.: 12/631,318

(22) Filed: Dec. 4, 2009

(65) Prior Publication Data

US 2010/0082502 A1 Apr. 1, 2010

Related U.S. Application Data

(63) Continuation-in-part of application No. 11/806,275, filed on May 31, 2007, now abandoned.

(51) Int. Cl.
*G06Q 40/00* (2006.01)
(52) U.S. Cl. ........................................ 705/36 R; 705/35
(58) Field of Classification Search ............... 705/35, 705/36
See application file for complete search history.

(56) References Cited

U.S. PATENT DOCUMENTS

2005/0171893 A1\* 8/2005 Gaer ............................ 705/37
2006/0200400 A1\* 9/2006 Hunter et al. ............... 705/36 R

OTHER PUBLICATIONS

DIALOG(R)File 148:Gale Group Trade & Industry DB (c) 2011 Gale/Cengage.. 0028129860 Supplier No. 226362193 Volatility exposure for strategic asset allocation.Briere, Marie; Burgues, Alexandre; Signori, Ombretta Journal of Portfolio Management , 36. 3 , 1.\*

\* cited by examiner

*Primary Examiner* — Richard C Weisberger
(74) *Attorney, Agent, or Firm* — Chun-Ming Shih

(57) ABSTRACT

The present invention discloses an investment allocation system for managing investment return and risk and method thereof. The investment allocation system comprises a storage unit, a return rate computation unit, a standard deviation computation unit, an operation unit, and an allocation process unit. The storage unit stores a threshold, first data sets, and second data sets. The return rate computation unit transforms the data sets into return rate sequences. The standard deviation computation unit transforms the return rate sequences into standard deviation sequences. The threshold is assigned to the first standard deviation sequence in order to obtain a corresponding kth-quantile thereof. Further, an operation unit locates an object according in the kth-quantile into the second standard deviation sequence. The operation unit further processes the second standard deviation sequence to obtain a robustness index. Also, an allocation process unit allocates assets by processing the robustness indexes.

19 Claims, 4 Drawing Sheets

INVESTMENT ALLOCATION SYSTEM FOR MANAGING INVESTMENT RETURN AND RISK AND METHOD THEREOF

This application is a Continuation-In-Part of U.S. patent application Ser. No. 11/806,275, for Investment Allocation System, Analysis Module And Method Thereof, filed on May 31, 2007, the entire contents of which are incorporated herein by reference. The application Ser. No. 11/806,275 claims priority to a Taiwanese Patent Application, 095131215, filed on Aug. 24, 2006.

BACKGROUND OF THE INVENTION (a) Field of the Invention

The present invention is related to an investment allocation system for managing investment return and risk and method thereof. Particularly, the present invention provides a robustness index to evaluate the stability of growth of potential investments.

(b) Description of the Prior Art

Nowadays, people are making a variety of investment, so there are all kinds of products and services available on the market about analyzing investment combination for expected profit returns and reduced risks, such as Monte Carlo simulation and value-at-risk (VaR) model.

Admittedly, those approaches have their advantages. For example, Monte Carlo simulation can calculate non-normal distribution accurately by random sampling and VaR model can mark the boundary between normal days and extreme events. However, they do have drawbacks. For instance, Monte Carlo simulation consumes lots of time and cost, and VaR model is undesired to deal with tails of probability distribution.

Furthermore, the criterion of a financial asset performance varies from time to time, and return of investment (ROI) is not the only criterion considered anymore. That is, performance of a financial asset having the same return of investment (ROI) in a bull market is not consistent with that in a bear market. Moreover, there is lack of useful tool on the market for investors to allocate market exposure.

The present invention provides an effective system and method to help investors analyze a financial asset by quantitative method, e.g., stability of growth, extent of fluctuations, or extent of adaptability.

SUMMARY OF THE INVENTION

The investment allocation system for managing investment return and risk comprises a storage unit, a return rate computation unit, a standard deviation computation unit, an operation unit, and an allocation process unit. The storage unit stores a threshold, some first data sets comprising market-to-market values of several potential investments, and the storage unit also stores some second data sets comprising market-to-market values of benchmark assets. Then the return rate computation unit transforms the first data sets into a first return rate sequence and also transforms the second data sets into a second return rate sequences.

Besides, the standard deviation computation unit transforms the first return rate sequence into a first standard deviation sequence containing a first ordered list of objects and also transforms the second return rate sequence into a second standard deviation sequence containing a second ordered list of objects. Following the threshold is assigned to a cumulative distribution function in accordance with the first standard deviation sequence in order to obtain a corresponding kth-quantile thereof. Further, an operation unit assigns a specific object in accordance with the kth-quantile in the first standard deviation sequence. In the second return rate sequence, the operation unit further divides the number of the second list of objects having smaller values than the specific object by the number of the whole second list of objects to obtain a robustness index. Also, an allocation process unit allocates assets by processing the robustness indexes of certain potential investments.

On the other hand, the present invention provides a method of managing investment return and risk by an investment allocation system. In the beginning, the storing unit stores a threshold, several first data sets comprising market-to-market values of some potential investments, and several second data sets comprising market-to-market values of benchmark assets. Next, a return rate computation unit processes the first data set and the second data set to obtain a first return rate sequence and a second return rate sequence respectively. A standard deviation computation unit further processes the first return rate sequence and the second return rate sequence to obtain a first standard deviation sequence and a second standard deviation sequence respectively.

After that, an operation unit generates a cumulative distribution function according to the first standard deviation sequence and assigns the threshold, which is stored in the storage unit, to the cumulative distribution function in order to obtain a quantile of the cumulative distribution function according to the threshold. Next, the operation unit assigns a specific object in the first ordered list of objects according to the quantile and inserts the specific object to the second standard deviation sequence. Thus, robustness indexes can be obtained by dividing the number of the second list of objects having smaller values than the specific object by the number of the whole second list of objects. Finally, an allocation process unit allocates market exposure according to the robustness indexes.

Furthermore, the present invention discloses a computer-readable storage medium encoded with processing instructions executable by a computer for implementing a method for generating a robustness index to manage investment return and risk. The processing instructions are described as following statements. In the beginning, the storing unit stores a threshold, some first data sets comprising market-to-market values of some potential investments, and some second data sets comprising market-to-market values of benchmark assets. Next, a return rate computation unit processes the first data set and the second data set to obtain a first return rate sequence and a second return rate sequence respectively. A standard deviation computation unit further processes the first return rate sequence and the second return rate sequence to obtain a first standard deviation sequence and a second standard deviation sequence.

After that, an operation unit generates a cumulative distribution function according to the first standard deviation sequence and assigns the threshold, which is stored in the storage unit, to the cumulative distribution function in order to obtain a quantile of the cumulative distribution function according to the threshold. Next, the operation unit assigns a specific object in the first ordered list of objects according to the quantile and locates the specific object in the second standard deviation sequence. Thus, robustness indexes can be obtained by dividing the number of the second list of objects having smaller values than the specific object by the number of the whole second list of objects. Finally, an allocation process unit allocates market exposure according to the robustness indexes.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
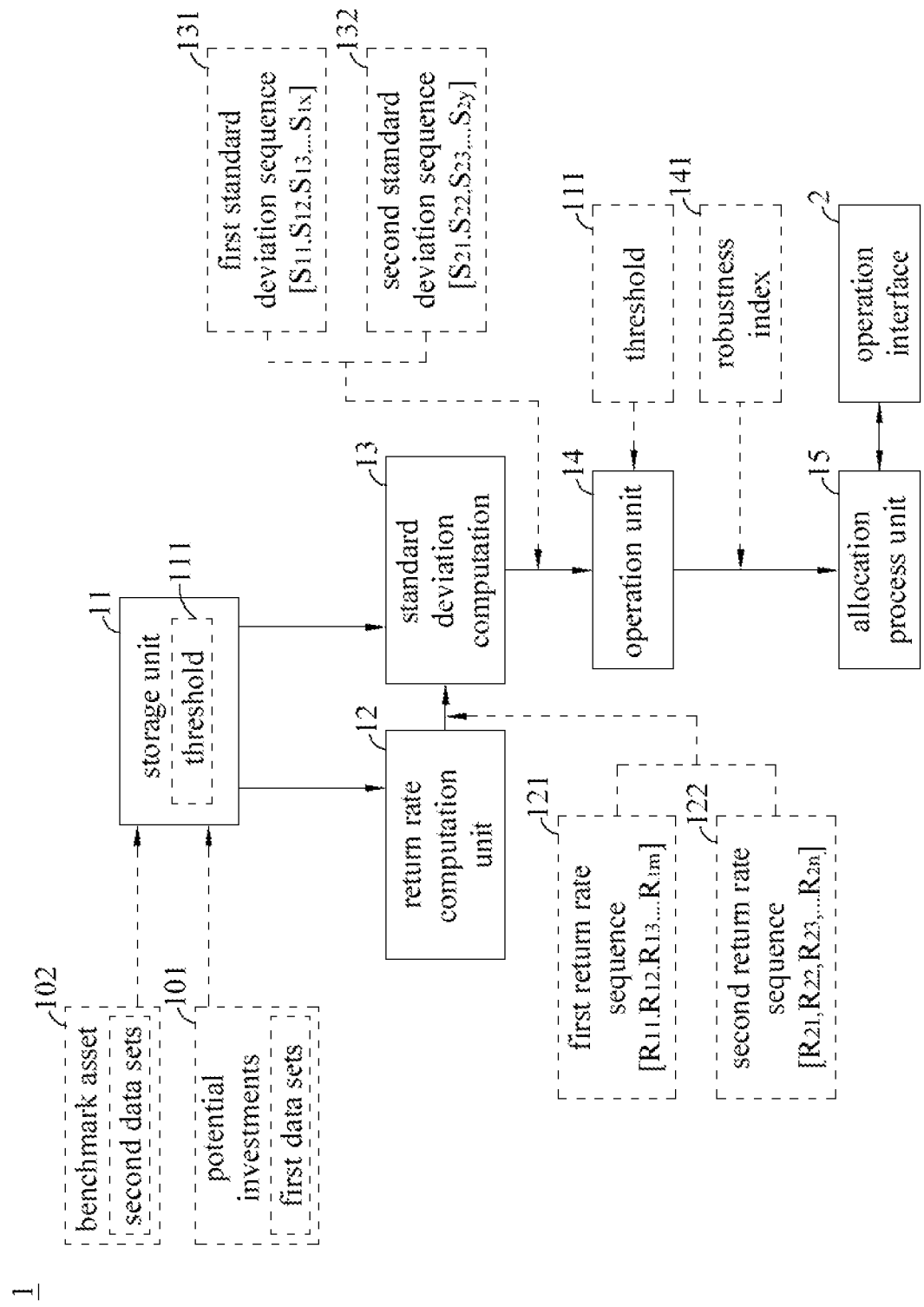
FIG. 1 is a block chart of an investment allocation system of the present invention.

The present invention discloses an investment allocation system 1 for managing investment return and risk and method thereof. Please refer to FIG. 1, the present invention provides an investment allocation system 1 comprises a storage unit 11, a return rate computation unit 12, a standard deviationan computation unit 13, operation unit 14, and an allocation process unit 15. The investment allocation system 1 can be installed in electronic devices, such as computer, PDA, or other electronic devices. Also, the storage unit 11, the return rate computation unit 12, the standard deviationan computation unit 13, the operation unit 14, and the allocation process unit 15 can be installed in the memory or hard disk of the electronic devices.

The storage unit 11 stores a threshold 111, a plurality of first data sets 101 comprising market-to-market values of several potential investments, and a plurality of second data sets 102 comprising market-to-market values of benchmark assets. The benchmark assets can be historical data of some financial assets, such as historical data of funds, stocks, securities, futures, foreign currencies, bonds, options, or subscription certificates. Moreover, the benchmark assets can be raw data provided by the user of the investment allocation system 1.

Besides, the return rate computation unit 12 transforms the plurality of first data sets 101 into a first return rate sequence 121 $[R_{11}, R_{12}, R_{13}, \ldots, R_{1m}]$ and also transforms the second data sets into a second return rate sequences 122 $[R_{21}, R_{22}, R_{23}, \ldots, R_{2n}]$. The return rate computation unit predicts the rebounded ability of investments from the recession. For example, Black Monday, Oct. 19, 1987, when stock markets around the world crashed, shedding a huge value in a very short time, the Dow Jones Industrial Average (DMA) dropped by 508 points to 1738.74 (22.61%). At that time, all that investors want to know is the rebounded ability of their investments. Calculating the return rate is a primary step of analyzing the rebounded ability.

Following the standard deviation computation unit 13 processes the first return rate sequence into a first standard deviation sequence containing a first list of ordered objects 131 $[S_{11}, S_{12}, S_{13}, \ldots, S_{1x}]$ and processes the second return rate sequence into a second standard deviation sequence containing a second list of ordered objects 132 $[S_{21}, S_{22}, S_{23}, \ldots, S_{2y}]$. Then an operation unit 14 assigns the threshold to a cumulative distribution function in accordance with the first standard deviation sequence 131 in order to obtain a corresponding kth-quantile thereof. Further, the operation unit 14 locates a specific object in the first list of objects in accordance with the kth-quantile, and divides the number of the second list of objects having smaller values than the specific object by the number of the whole second list of objects to obtain a robustness index 141. Also referring to FIG. 2, the user of the investment allocation system 1 can choose certain potential assets 102 according to the robustness index 141 thereof through an interface 2. An allocation process unit 15 allocates market exposure by processing the robustness indexes 141 of the chosen assets.

Figure 3:
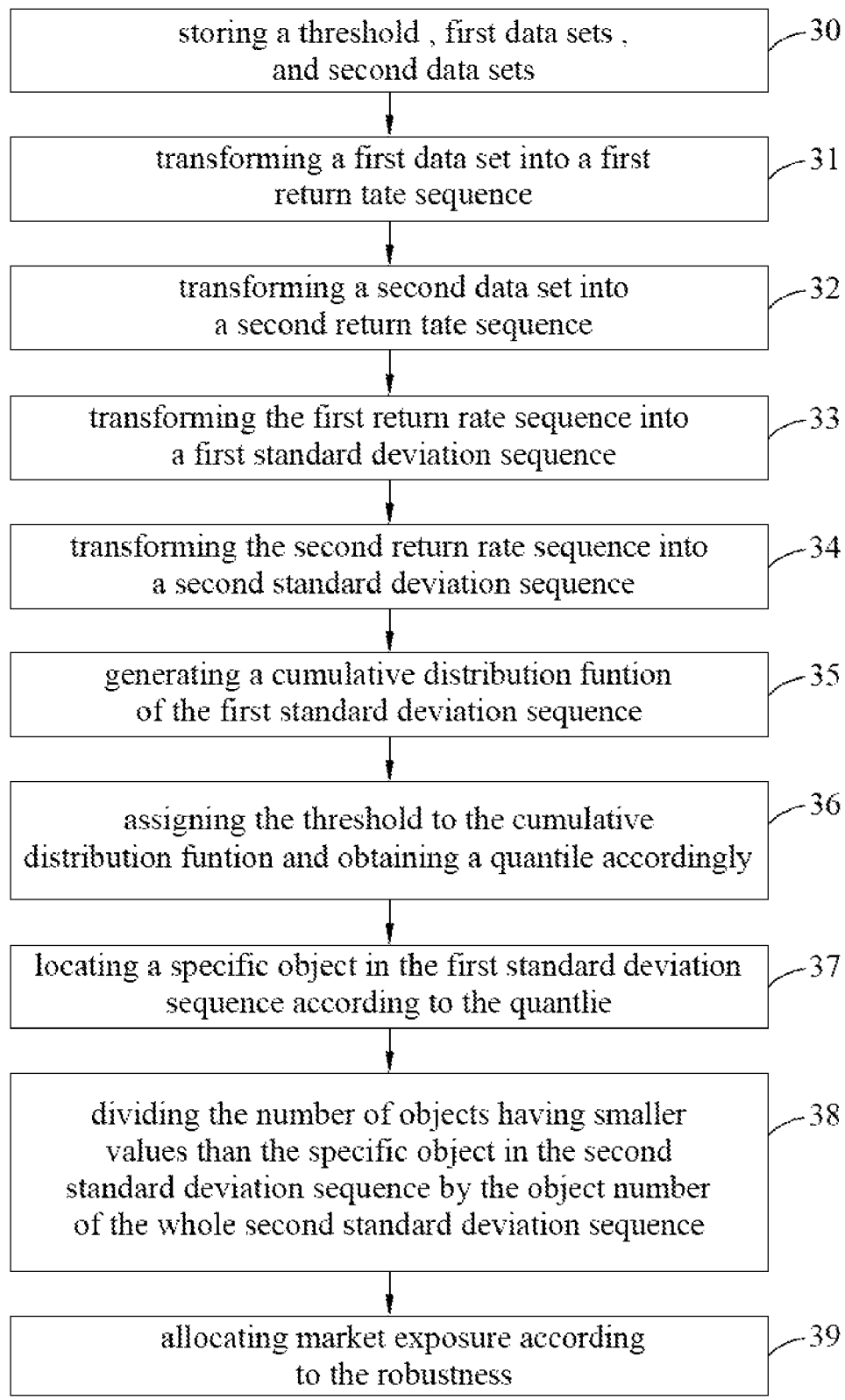
FIG. 3 is a flow chart showing a method of an investment allocation of the present invention.

Please referring to FIG. 3, a method of investment allocation for managing investment return and risk comprising the following steps. In step 30, the storing unit stores a threshold, some first data sets comprising market-to-market values of some potential investments, and some second data sets comprising market-to-market values of benchmark assets. Next in step 31 and step 32, a return rate computation unit processes the first data set and the second data set to obtain a first return rate sequence and a second return rate sequence respectively. For example, the second data set is the market-to-market values of a benchmark asset during a time period, so it would be $[V_{21}, V_{22}, V_{23}, V_{24}, \ldots, V_{2n}]$. Then the return rate computation unit processes it by the function: $R_{n+h}=(V_{n+h}-V_n)/V_n$, R is the return rate sequence; $V_n$ are market-to-market values from the first data set and second data set and $n \geq 0$; and h is time period, which is a constant. Therefore a sequence is form and then rearrange in order it to obtain a second return rate sequence containing ordered objects, such as $[R_{21}, R_{22}, R_{23}, R_{24}, \ldots R_{2n}]$. By the same computation, a first return rate sequence can be also obtained, such as $[R_{11}, R_{12}, R_{13}, R_{14}, \ldots R_{1m}]$.

Following in step 33 and step 34, a standard deviation computation unit processes the first return rate sequence to obtain a first standard deviation sequence containing a first ordered list of objects and processes the second return rate sequences to obtain a second standard deviation sequence containing a second ordered list of objects. The processing method illustrates by the following example. The first step is calculating the standard deviation $S_{11}$ of sequence $[R_{11}, R_{12}, R_{13}, R_{14}]$, next step is calculating the standard deviation $S_{12}$ of sequence $[R_{12}, R_{13}, R_{14}, R_{15}]$, and keep calculating this way to obtain the whole first standard deviation sequence $[S_{11}, S_{12}, S_{13}, \ldots, S_{1x}]$. By the same way, a second standard deviation sequence $[S_{21}, S_{22}, S_{23}, \ldots, S_{2y}]$ can be obtained as well.

In step 35, an operation unit generates a cumulative distribution function according to the first standard deviation sequence and, in step 36, it assigns the threshold to the cumulative distribution function to obtain a quantile of the cumulative distribution function according to the threshold. For instance, if the threshold is a percentage 75%, the quantile according to it is $3^{rd}$-quantile.

Next in step 37, the operation unit locates a specific object in the first ordered list of objects according to the quantile. Thus in step 38, robustness indexes can be obtained by dividing the number of the second list of objects having smaller values than the assigned object in step 37 by the number of the whole second list of objects. For example, if the quantile is a $3^{rd}$-quantile and the object corresponding to the $3^{rd}$-quantile in the first list of objects is $S_{19}$, the objects of the second list of objects having smaller values than $S_{19}$ are $S_{21}, S_{22}, S_{23}, S_{24}$, and the number of the whole second list of objects is y. Therefore, a robustness index of the first data set can be obtained as 4/y.

Finally in step 39, an allocation process unit allocates market exposure according to the robustness indexes. Please also referring to FIG. 2, which illustrates an operation interface 2 and assuming if a user of the investment allocation system has net capital $1,000,000 and obtains the information that a robustness index of a first fluid is 0.65, a robustness index of a second fund is 0.80, and a robustness index of a third fund is 0.90, and the user decides to invest in all three funds, the market exposure would be 27.65% for the first fund, 34% for the second fund, and 38.35% for the third fund. Those ratios are obtained by the following normalization process.

0.2765=0.65/(0.65+0.80+0.9)

0.34=0.8/(0.65+0.80+0.9)

0.3835=0.9/(0.65+0.80+0.9)

Accordingly, the user invests $276,500 in the first fund, $340,000 in the second fund, and $383,500 in the third fund.

However, users of the investment allocation system might only interest in certain types of investments or only interest in high potential investments in certain categories of investments. It would be easier for the user to choose the desire products to invest according to their rankings, so the allocation process unit may further arrange products in the same category to have different rankings, that is, A, B, C, D, and E are given to all stocks according to their robustness index, so does to all foreign currencies, to all securities, to bonds, and so on. Thus, a stock with robustness index 0.8 might be ranked as "A" in stocks category, but a foreign currencies with robustness index 0.8 might be ranked as "B" in foreign currencies category.

Figure 2:
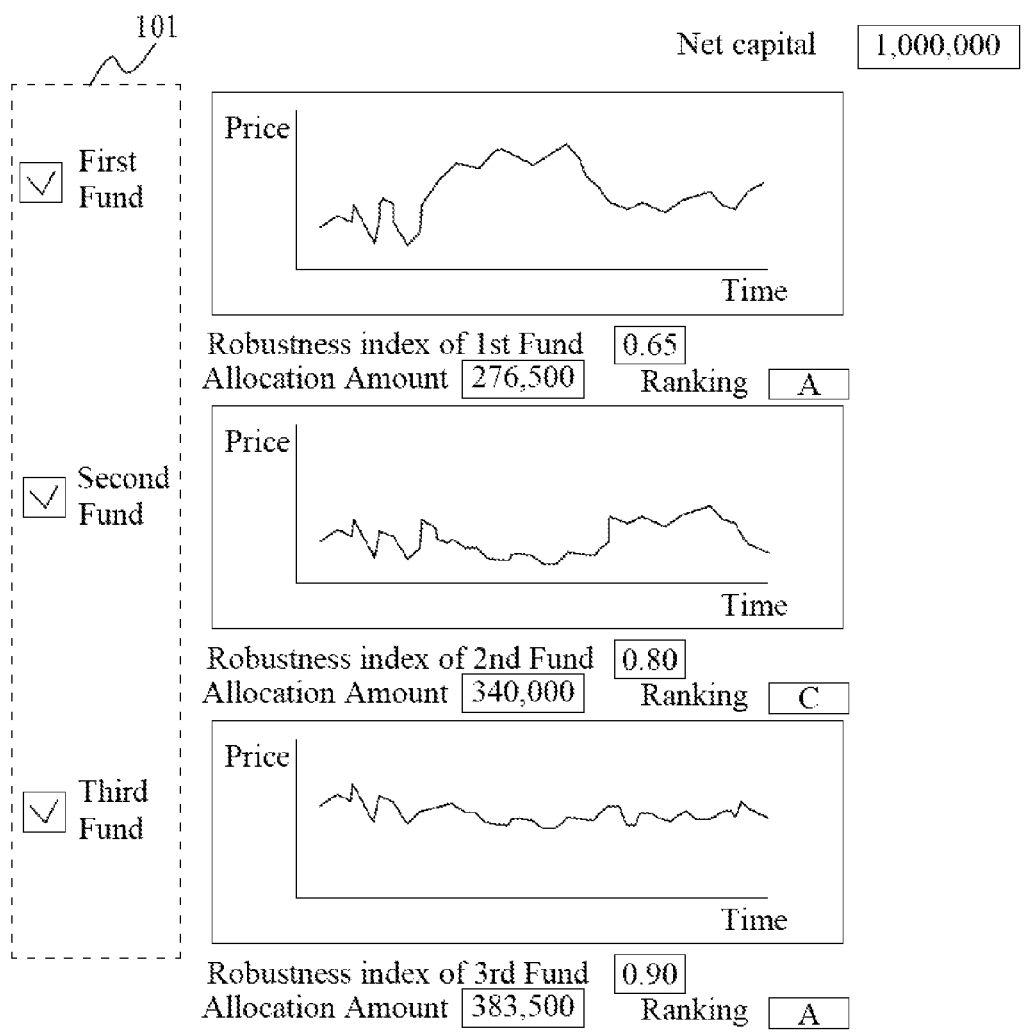
FIG. 2 is a schematic view showing an operation interface for the investment allocation system of the present invention.

Therefore, assuming a user of the investment allocation system only interests in stocks and foreign currencies, also the first fund shown in FIG. 2 is a stock, and the second and the third fund are foreign currencies, since the first fund is ranked as A in the stock category and the third fund is also ranked as A in the foreign currencies category while the second fund is ranked as C in the foreign currencies category. A conservative investor who only interests in stock and foreign currencies may adjust the market exposure of these three funds to 1:0.9:1 by assigning larger coefficient to higher ranking.

0.65=0.65×1

0.72=0.8×0.9

0.9=0.9×1

Then perform normalization process to the three chosen stocks as follows to obtain the market exposure is 28.63% for the first stock, 31.32% for the second fund, and 39.65% for the third stock fund.

0.2863=0.65/(0.65+0.72+0.9)

0.3132=0.72/(0.65+0.72+0.9)

0.3965=0.9/(0.65+0.72+0.9)

Accordingly, the user invests $286,300 in the first stock, $313,200 in the second fund, and $396,500 in the third fund.

Figure 4:
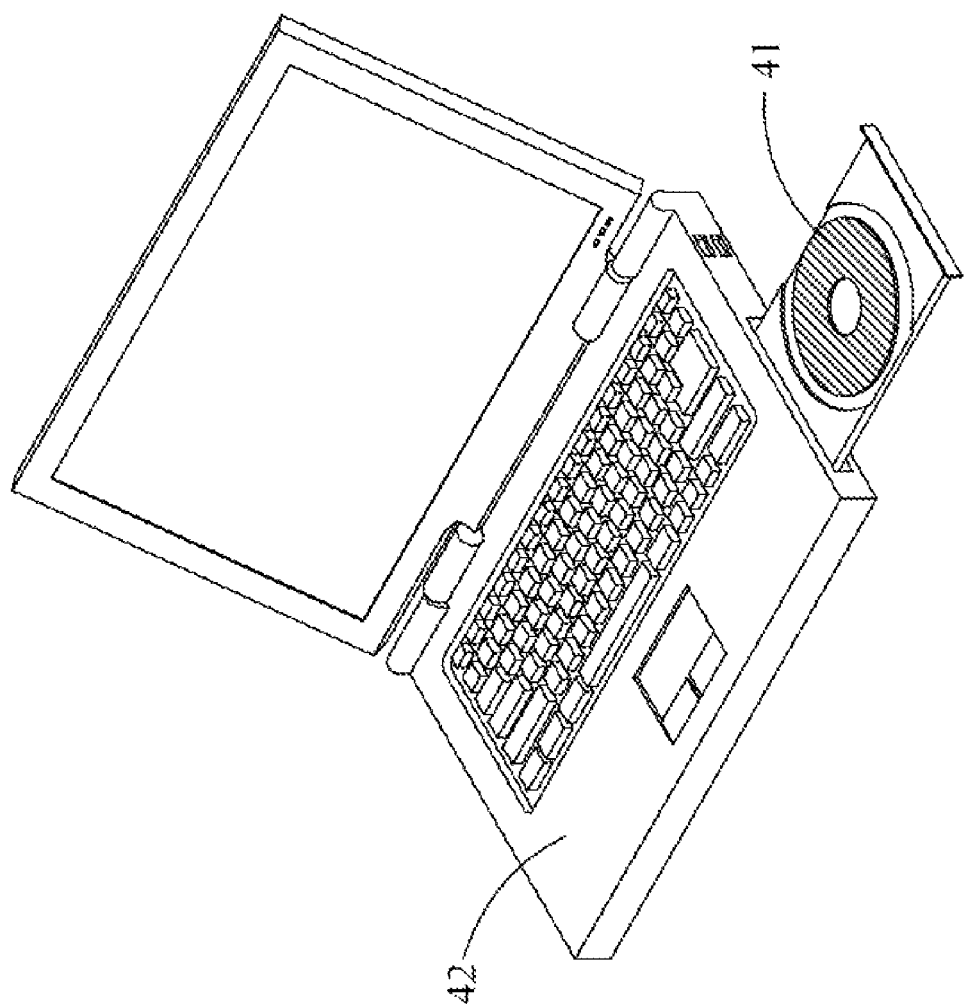
FIG. 4 is a schematic view showing a computer-readable storage medium encoded with processing instructions executable by a computer of the present invention.

Now please refer to FIG. 4, the present invention also discloses a computer-readable storage medium 41 encoded with processing instructions executable by a computer 42 for implementing a method for generating a robustness index to manage investment return and risk. Please also refer to FIG. 3, the processing instructions executed in the computer 42 are illustrated as following. The computer-readable storage medium 41 may be a CD, flash disk, floppy disk, or a removable hard disk.

In step 30, the storing unit stores a threshold, some first data sets comprising market-to-market values of some potential investments, and some second data sets comprising market-to-market values of benchmark assets. Next in step 31 and step 32, a return rate computation unit processes the first data set and the second data set to obtain a first return rate sequence and a second return rate sequence respectively.

For example, the second data set is the market-to-market values of a benchmark asset during a time period, so it would be $[V_{21}, V_{22}, V_{23}, V_{24}, \ldots, V_{2n}]$. Then the return rate computation unit processes it by the function: $R_{n+h}=(V_{n+h}-V_n)/V_n$, R is the return rate sequence; $V_n$ are market-to-market values from the first data set and second data set and $n \geq 0$; and h is time period, which is a constant. Therefore a sequence is form and then rearrange in order it to obtain a second return rate sequence containing ordered objects, such as $[R_{21}, R_{22}, R_{23}, R_{24}, \ldots R_{2n}]$. By the same computation, a first return rate sequence can be also obtained, such as $[R_{11}, R_{12}, R_{13}, R_{14}, \ldots R_{1m}]$.

Following in step 33 and step 34, a standard deviation computation unit processes the first return rate sequence to obtain a first standard deviation sequence containing a first ordered list of objects and processes the second return rate sequences to obtain a second standard deviation sequence containing a second ordered list of objects. The processing method illustrates by the following example. The first step is calculating the standard deviation $S_{11}$ of sequence $[R_{11}, R_{12}, R_{13}, R_{14}]$, next step is calculating the standard deviation $S_{12}$ of sequence $[R_{12}, R_{13}, R_{14}, R_{15}]$, and keep calculating this way to obtain the whole first standard deviation sequence $[S_{11}, S_{12}, S_{13}, \ldots, S_{1x}]$. By the same way, a second standard deviation sequence $[S_{21}, S_{22}, S_{23}, \ldots S_{2y}]$ can be obtained as well.

In step 35, an operation unit generates a cumulative distribution function according to the first standard deviation sequence and, in step 36, it assigns the threshold to the cumulative distribution function to obtain a quantile of the cumulative distribution function according to the threshold. For instance, if the threshold is a percentage 75%, the quantile according to it is $3^{rd}$-quartile.

Next in step 37, the operation unit locates a specific object in the first ordered list of objects according to the quantile. Thus in step 38, robustness indexes can be obtained by dividing the number of the second list of objects having smaller values than the assigned object in step 37 by the number of the whole second list of objects. For example, if the quantile is a $3^{rd}$-quartile and the object corresponding to the $3^{rd}$-quartile in the first list of objects is $S_{19}$, the objects of the second list of objects having smaller values than $S_{19}$ are $S_{21}, S_{22}, S_{23}, S_{24}$, and the number of the whole second list of objects is y. Therefore, a robustness index of the first data set can be obtained as 4/y.

Finally in step 38, an allocation process unit allocates market exposure according to the robustness indexes. Please also referring to FIG. 2, FIG. 2 illustrates an operation interface and assuming if a user of the investment allocation system has net capital $1,000,000 and obtains the information that a robustness index of a first fund is 0.65, a robustness index of a second fund is 0.80, and a robustness index of a third fund is 0.90, and the user decides to invest in all three fluids, the market exposure would be 27.65% for the first fund, 34% for the second fund, and 38.35% for the third fund. Those ratios are obtained by the following normalization process.

0.2765=0.65/(0.65+0.80+0.9)

0.34=0.8/(0.65+0.80+0.9)

0.3835=0.9/(0.65+0.80+0.9)

Accordingly, the user invests $276,500 in the first fund, $340,000 in the second fund, and $383,500 in the third fluid.

However, users of the investment allocation system might only interest in certain types of investments or only interest in high potential investments in certain categories of investments. It would be easier for the user to choose the desire products to invest according to their rankings, so the allocation process unit may further arrange products in the same category to have different rankings, that is, A, B, C, D, and E are given to all stocks according to their robustness index, so does to all foreign currencies, to all securities, to bonds, and so on. Thus, a stock with robustness index 0.8 might be ranked as "A" in stocks category, but a foreign currencies with robustness index 0.8 might be ranked as "B" in foreign currencies category.

Therefore, assuming a user of the investment allocation system only interests in stocks and foreign currencies, also the first fund shown in FIG. 2 is a stock, and the second and the third fund are foreign currencies, since the first fund is ranked as A in the stock category and the third fund is also ranked as A in the foreign currencies category while the second fund is ranked as C in the foreign currencies category. A conservative investor who only interests in stock and foreign currencies may adjust the market exposure of these three funds to 1:0.9:1 by assigning larger coefficient to higher ranking.

0.65=0.65×1

0.72=0.8×0.9

0.9=0.9×1

Then perform normalization process to the three chosen stocks as follows to obtain the market exposure is 28.63% for the first stock, 31.32% for the second fund, and 39.65% for the third stock fund.

0.2863=0.65/(0.65+0.72+0.9)

0.3132=0.72/(0.65+0.72+0.9)

0.3965=0.9/(0.65+0.72+0.9)

Accordingly, the user invests $286,300 in the first stock, $313,200 in the second fund, and $396,500 in the third fund.

The present invention has been described with some preferred embodiments thereof and it is understood these embodiments are illustrated only for exemplification and not intended to limit the present invention. The control of the light-emitting units to different brightness or the adjustment of the display parameters can be performed independently or at the same time. It is also understood that many changes and modifications in the described embodiments can be carried out without departing from the scope and the spirit of the invention that is intended to be limited only by the appended claims.

What is claimed is:

1. An investment allocation system for managing investment return and risk comprising:

a storage unit tangibly embodied in a device and storing a threshold, a plurality of first data sets each comprising market-to-market values of one of a plurality of potential investments, and a second data set comprising market-to-market values of a benchmark asset;

a return rate computation unit tangibly embodied in said device and transforming said first data set into a first return rate sequence, and transforming each of said second data sets into a second return rate sequences;

a standard deviation computation unit tangibly embodied in said device and processing said first return rate sequence to obtain a first standard deviation sequence containing a first ordered list of objects; further said standard deviation computation unit processing said second return rate sequences to obtain a second standard deviation sequence containing a second ordered list of objects;

an operation unit tangibly embodied in said device and processing said first standard deviation sequence by said threshold stored in said storage unit, said threshold being assigned to said first standard deviation sequence in order to obtain a corresponding kth-quantile thereof, further said operation unit locating a specific object in said first ordered list of objects in accordance with said kth-quantile, in said second return rate sequence, said operation unit further dividing the number of said second list of objects having smaller values than said specific object by the number of the whole second list of objects to obtain a robustness index; and an allocation process unit tangibly embodied in said device for allocating assets said plurality of potential investments according to said robustness indices thereof.

2. The investment allocation system in claim 1, said storage unit, said return rate computation unit, said operation unit, and said allocation process unit are tangibly embodied in said device, wherein said device is selected from a memory and a hard disk.

3. The investment allocation system in claim 1, wherein said benchmark asset are selected from historical data of at least one financial asset and raw data provided by the user of said investment allocation system.

4. The investment allocation system in claim 2, wherein said financial asset is selected from funds, stocks, securities, futures, foreign currencies, bonds, options, and subscription certificates.

5. The investment allocation system in claim 1, wherein said return rate sequences are obtained by the following function: $R_{n+h}=(V_{n+h}-V_n)/V_n$, where R is the return rate sequence containing ordered objects; $V_n$ is the $n_{th}$ market-to-market value from said first data set and second data set; $n \geqq 0$; and h is time period, which is a constant.

6. The investment allocation system in claim 1, wherein said threshold is a pre-determined possibility of a cumulative distribution function generated in accordance with said first return rate sequence, and said first return rate sequence is divided into certain quantiles.

7. The investment allocation system in claim 1, wherein said allocation process unit processes a normalization on said robustness indices of several financial assets and allocates market exposure accordingly.

8. A method of investment allocation for managing investment return and risk comprising the following steps:

storing a threshold in a storage unit tangibly embodied in a device;

storing a plurality of first data sets each comprising market-to-market values of one of a plurality of potential investments in a storage unit tangibly embodied in said device;

selecting second data set comprising market-to-market values of a benchmark asset in said storage unit;

processing said first data set by a return rate computation unit tangibly embodied in said device and then obtaining a first return rate sequence;

processing said second data set by said return rate computation unit and then obtaining a second return rate sequence;

processing said first return rate sequence by a standard deviation computation unit tangibly embodied in said device and then obtaining a first standard deviation sequence containing a first ordered list of objects;

processing said second return rate sequence by said standard deviation computation unit and then obtaining a second standard deviation sequence containing a second ordered list of objects;

generating a cumulative distribution function according to said first standard deviation sequence by an operation, unit tangibly embodied in said device;

assigning said threshold to said cumulative distribution function by said operation unit;

choosing a quantile of said cumulative distribution function according to said threshold by said operation unit;

locating a specific object in said first ordered list of objects according to said quantile by said operation unit;

obtaining a robustness index in said operation unit by dividing the number of said second list of objects having smaller values than said specific object by the number of the whole second list of objects; and allocating market exposure of said potential investments according to said robustness indices by an allocation process unit tangibly embodied in said device.

9. The method of investment allocation for managing investment return and risk in claim 8, wherein said storage unit, said return rate computation unit, said standard deviation computation unit, said operation unit, and said allocation process unit are tangibly embodied in said device, wherein said device selected from a memory and a hard disk.

10. The method of investment allocation for managing investment return and risk in claim 8, wherein said benchmark asset are selected from historical data of at least one financial asset and raw data provided by the user of said investment allocation system.

11. The method of investment allocation for managing investment return and risk in claim 10, wherein said financial asset is selected from funds, stocks, securities, futures, foreign currencies, bonds, options, and subscription certificates.

12. The method of investment allocation for managing investment return and risk in claim 8, wherein said steps of processing said first and second data set in said return rate computation unit to obtain said first and second return rate sequences comprise the following computation: $R_{n+h} = (V_{n+h} - V_n)/V_n$, R is the return rate sequence containing ordered objects; $V_n$ are market-to-market values from said first data set and second data set and $n \geq 0$; and h is time period, which is a constant.

13. The method of investment allocation for managing investment return and risk in claim 8, wherein the step of allocating market exposure according to said robustness index further comprises the steps of:

performing a normalization process on said robustness indexes of a plurality of financial assets; and allocating market exposure by the result of said normalization process.

14. A computer-readable storage medium encoded with processing instructions executable by a computer for implementing a method for generating a robustness index to manage investment return and risk, wherein said processing instructions, when executed in said computer, comprising:

storing a threshold in a storage unit tangibly embodied in a device;

storing a plurality of first data sets each comprising market-to-market values of one of a plurality of potential investments in a storage unit tangibly embodied in said device;

selecting second data set comprising market-to-market values of a benchmark asset in said storage unit tangibly embodied in said device;

processing said first data set by a return rate computation unit tangibly embodied in said device and then obtaining a first return rate sequence;

processing said second data set by said return rate computation unit tangibly embodied in said device and then obtaining a second return rate sequence;

processing said first return rate sequence by a standard deviation computation unit tangibly embodied in said device and then obtaining a first standard deviation sequence containing a first ordered list of objects;

processing said second return rate sequence by said standard deviation computation unit tangibly embodied in said device and then obtaining a second standard deviation sequence containing a second ordered list of objects;

generating a cumulative distribution function according to said first standard deviation sequence by an operation unit tangibly embodied in said device;

assigning said threshold to said cumulative distribution function by said operation unit;

choosing a quantile of said cumulative distribution function according to said threshold by said operation unit;

locating a specific object in said first ordered list of objects according to said quantile by said operation unit;

obtaining a robustness indexes in said operation unit by dividing the number of said second list of objects having smaller values than said specific object by the number of the whole second list of objects; and allocating market exposure according to said robustness indexes by an allocation process unit tangibly embodied in said device.

15. The computer-readable storage medium in claim 14, wherein said storage unit, said return rate computation unit, said standard deviation computation unit, said operation unit, and said allocation process unit are tangibly embodied in said device, wherein said device selected from a memory and a hard disk.

16. The computer-readable storage medium in claim 14, wherein said benchmark asset are selected from historical data of at least one financial asset and raw data provided by the user of said investment allocation system.

17. The computer-readable storage medium in claim 16, wherein said financial asset is selected from funds, stocks, securities, futures, foreign currencies, bonds, options, and subscription certificates.

18. The computer-readable storage medium in claim 14, wherein said instructions of processing said first and second data set in said return rate computation unit to obtain said first and second return rate sequences comprise the following computation: $R_{n+h} = (V_{n+h} - V_n)/V_n$, R is the return rate sequence containing ordered objects; $V_n$ are market-to-market values from said first data set and second data set and $n \geq 0$; and h is time period, which is a constant.

19. The computer-readable storage medium in claim 14, wherein said instructions of allocating market exposure according to said robustness index further comprises the instructions of:

performing a normalization process on said robustness indexes of a plurality of financial assets; and allocating market exposure by the result of said normalization process.

* * * * *